April 28, 1936.   J. C. TEMPLETON   2,038,914
OPTICAL SYSTEM FOR OBSERVING DISPLACEMENT OR DEFLECTION
IN CONNECTION WITH MEASURING INSTRUMENTS
Filed April 26, 1934
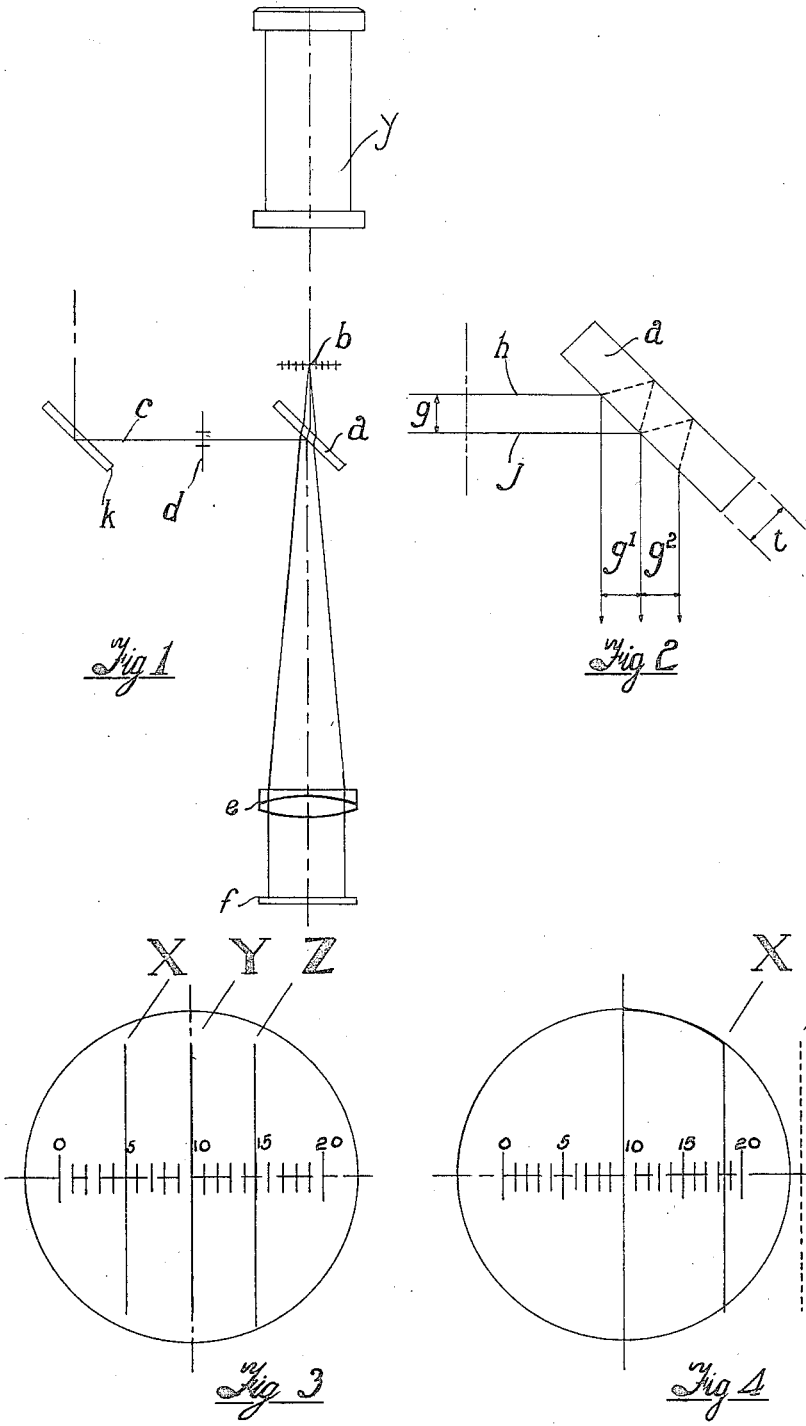
INVENTOR
JAMES C. TEMPLETON
BY Norris & Bateman
ATTORNEYS Patented Apr. 28, 1936

2,038,914

UNITED STATES PATENT OFFICE 2,038,914

OPTICAL SYSTEM FOR OBSERVING DISPLACEMENT OR DEFLECTION IN CONNECTION WITH MEASURING INSTRUMENTS

James Clark Templeton, London, England

Application April 26, 1934, Serial No. 722,566
In Great Britain September 30, 1933

6 Claims. (Cl. 88—2.3)

This invention relates to a telescopic reading arrangement for measuring instruments. The invention is particularly intended to be applied to magnetic force variometers or field balances but may also be employed in connection with other scientific instruments where telescopic reading of displacement or deflection is desired.

The reading arrangement according to the invention is of the kind in which an autocollimating telescope is employed for reading the deflection of a mirror fixed to a magnetic needle or other deflecting system.

According to the invention, a telescope equipped with a scale for reading the deflection of an image produced in the telescope is illuminated from the side through the medium of an inclined reflector located in the telescope at a point below the scale, i. e. between the scale and the object glass of the telescope.

According to the invention also, a telescope illuminated from the side through the medium of an inclined reflector located in the telescope is equipped with an index mark or marks located in the line of illumination, at a point between the said inclined reflector and the light source and in correct position for collimation, the arrangement being such that an image of the said index mark or marks is produced in the telescope by reflection from a mirror attached to the system whose deflection or displacement is to be observed.

In order that the invention may be readily understood, reference will now be made to the accompanying drawing in which:—

Figure 1 is a diagram illustrating the principle of the invention.

Figure 2 is a diagram drawn to a larger scale illustrating how the image of one index mark formed by reflection at one surface of a parallel plate inclined reflector can be made to coincide with the image of a second index mark formed by reflection at the second surface of the inclined reflector and, Figures 3 and 4 are diagrams showing certain relative positions in which the graduated scale and the images of the index marks may appear in the field of views.

Referring now to Figure 1, $e$ and $y$ represent the object glass and eyepiece respectively of a telescope, and $f$ represents a deflecting mirror arranged so that light projected through the object glass from within the telescope is reflected back into the telescope by the deflecting mirror. This mirror is mounted on a magnetic needle or other system whose movements are to be observed.

The telescope is equipped with a transparent scale or graticule $b$ situated in the mutual focal plane of the eyepiece and the object glass $e$ and also with an inclined parallel-plate mirror $a$ set at an angle of forty-five degrees to the axis of the telescope so that the telescope can be illuminated from the side.

Side illumination is provided by means for example of a mirror $k$ arranged so that light from a suitable source is directed through the side of the telescope onto the inclined reflector $a$ in a direction at right angles to the axis of the telescope.

The inclined reflector $a$ is placed at a point below the scale or graticule $b$, i. e. between this scale and the object glass of the telescope, and an index mark $d$ which may take the form of cross wires is placed in the line of illumination between the reflector $a$ and the source of light in correct position for collimation, i. e. in such position that light proceeding from a point in the plane of the index mark will, after reflection at the mirror $a$, be rendered parallel by the object glass $e$. This light is reflected back into the telescope by the deflecting mirror $f$ with the result that an image of the mark is formed in the plane of the scale $b$.

The observer views the scale or graticule directly through the eyepiece of a telescope and also sees at the same plane the image of the index mark formed by reflection at the deflecting mirror $f$. When this mirror is deflected the image is displaced with respect to the scale or graticule so that the deflection can be read directly. In this way speedy and accurate scale reading is obtained by simple observation of the position of the index mark.

In the above description account has been taken only of the effect of one of the reflecting surfaces of the parallel plate reflector $a$. Since this reflector possesses two surfaces of reflection however, it will be found that a duplicated image of the index mark or marks will be formed in the field of view. While this duplication of the image is not an obstacle to the operation of the system it introduces a possibility of ambiguity in the reading.

One method of avoiding this possibility of ambiguity is to employ a parallel-plate reflector of such thickness that the separation of the two images of the index mark or marks is so great as to take one of the images outside the field of vision when the other image is being observed on the scale. This method, however, has the disadvantage that with a field of view of normal extent of thickness of the parallel reflector plate has to be so great that the illumination available is undesirably decreased. For this reason it is preferred to employ a pair of index lines placed in the same focal plane but separated from one another by a distance so adjusted in relation to the thickness of the parallel plate reflector that the image of one line formed by reflection from one surface of the reflector will be superposed on the image of the second line formed by reflection from the other surface of the reflector. With this arrangement the image as observed in the field of view will consist of three lines, a central darker line (due to the superimposed images) and two secondary somewhat fainter lines disposed at equal distances on opposite sides of the central line. The central or main index line is thus emphasized and the possibility of ambiguity of reading avoided.

For the purpose of causing the image of one line formed by reflection from one surface of the reflector to be superimposed on the image of the second line formed by the reflection from the other surface of the reflector the distance between the index lines must be equal to $$\sqrt{2}\, t \tan\left(\sin^{-1} \frac{.707}{u}\right)$$

where $t$ is the thickness of the parallel plate reflector and $u$ the refractive index of the reflector.

As illustrated in Figure 2 $g$ represents the distance between the two index lines and $h$ and $j$ represent the lines of collimation of the pencils of light which proceed from these index lines and which after reflection from the reflector $a$ are focussed by their double passage through the object glass and reflection from the mirror $f$ to produce real images in the plane of the scale or graticule $b$. Each of the pencils of rays represented by the lines $h$ and $j$ splits into two parts at the lower surface of the reflector $a$, one part being reflected from the lower surface whilst the other part is refracted and is then reflected from the upper surface of the plate $a$. As illustrated in Figure 2, that part of the ray represented by $h$ which is refracted when it first meets the lower surface of the plate $a$ and then reflected from the upper surface of the plate coincides with the line of collimation of that part of the ray $j$ which is reflected when it first meets the lower surface of the plate $a$. There are thus formed four distinct pencils of rays two of which are coaxial and combine to form a central image. The two further images formed are separated from the central one by the distances G1 and G2.

By constructing the parallel plate reflector so that $$\sqrt{2}$$

times its thickness times tan $$\left(\sin^{-1} \frac{.707}{u}\right)$$

is equal to a given number of divisions of the scale or graticule, the useful range of the system may be extended since the subsidiary lines of the image formed in the field of vision will now appear at distances from the main or central line equal to the given number of scale divisions. Thus when the deflection of the main deflecting mirror is of such magnitude that the main or central index line is moved off the scale it will still be possible to read the instrument provided that one of the subsidiary lines remains on the scale as illustrated for example in Fig. 4 of the drawing. In the example shown in Figure 4 the parallel plate has been so constructed that each subsidiary line appears at a distance of five scale divisions from the main index line with the result that the value of extreme deflections are obtained by adding or subtracting five to the scale reading of the subsidiary lines.

It is to be understood that although the system described with reference to the accompanying drawing is provided with index marks in the form of wires or the like it is within the scope of the invention to employ in place of these index marks a black screen provided with one or more slots so the image produced in the field of view will consist of one or more bright lines on a black field. With this arrangement, which may conveniently be employed for photographic registration, the deflection may be measured against any suitable fixed datum which may be arranged to appear in the field of view as an illuminated spot or line.

I claim:—

1. A telescopic reading arrangement comprising a telescope illuminable from the side, an inclined light-transmitting and light-reflecting reflector located in the telescope, an index mark in the line of illumination at a point between the said inclined reflector and the light source, a graticule in the focal plane of the ocular, the objective of the telescope being in a position to render entrant rays reflecting the image of said index mark parallel, and to focus in the plane of said graticule rays, reflected from a displaceable light-reflecting member.

2. A telescopic reading arrangement comprising a telescope, an inclined light-transmitting and light-reflecting parallel plate reflector located in the telescope, an index mark in a lateral line of illumination at a point between the said inclined reflector and the light source, the objective of the telescope being in a position to render entrant rays reflecting the image of said index mark parallel and to focus in the plane of the ocular rays reflected from a displaceable light-reflecting member.

3. A telescopic reading arrangement according to claim 1 wherein the reflector is a parallel plate reflector and the index mark consists of two lines located in the same focal plane at such a distance from one another in relation to the thickness of the parallel plate reflector that an image of one line formed by reflection from one surface of the reflector is superimposed on an image of the other line formed by reflection of the other surface of the reflector whereby the possibility of ambiguity in reading due to duplication of the images is avoided.

4. A telescopic reading arrangement according to claim 1 wherein the reflector is a parallel plate and the index mark consists of two elements arranged so that duplicate images of the elements formed by reflection at opposite sides of the parallel plate reflector are produced in such relative positions that the index appearing in the field of view consists of a central stronger mark and two secondary fainter marks disposed at equal distances on opposite sides of the central mark.

5. A telescopic reading arrangement according to claim 1 wherein the reflector is a parallel plate and the index mark consists of two elements arranged so that duplicate images of the elements formed by reflection at opposite sides of the parallel plate reflector are produced in such relative positions that the index appearing in the field of view consists of a central stronger mark and two secondary fainter marks disposed at equal distances on opposite sides of the central mark, the distances between the central mark and the subsidiary marks being equal to a whole number of scale divisions substantially as and for the purpose set forth.

6. A telescope having a light-transmitting and light-reflecting reflector disposed at substantially 45° to the axis of the telescope, an eye piece, a scale between said reflector and the eye piece, an object glass in the rear of the reflector, a deflecting mirror in the rear of the object glass, an index mark at one side of the telescope, means at said side of the telescope to illuminate said index mark to cast an image therefrom onto said reflector to be in turn reflected on to the mirror, the object glass being positioned to render the entrant rays reflecting said image parallel, the light rays being reflected back into the telescope by said mirror to a focus at said scale.

JAMES CLARK TEMPLETON.